United States Patent
Vermesan et al.

(10) Patent No.: US 7,283,651 B2
(45) Date of Patent: Oct. 16, 2007

(54) MEASURING INSTRUMENT AND METHOD FOR OPTICAL MEASUREMENT OF VELOCITY AND DIRECTION OF PARTICLES

(75) Inventors: Ovidiu Vermesan, Stabekk (NO); Jon Nysaether, Oslo (NO); Ib-Rune Johansen, Oslo (NO); Jon Tschudi, Oslo (NO)

(73) Assignee: IDEX ASA, Fornebu (NO)

( * ) Notice: Subject to any disclaimer, the term of this patent is extended or adjusted under 35 U.S.C. 154(b) by 893 days.

(21) Appl. No.: 10/297,745

(22) PCT Filed: Jun. 8, 2001

(86) PCT No.: PCT/NO01/00239

§ 371 (c)(1),
(2), (4) Date: Apr. 28, 2003

(87) PCT Pub. No.: WO01/99036

PCT Pub. Date: Dec. 27, 2001

(65) Prior Publication Data

US 2003/0161511 A1   Aug. 28, 2003

(30) Foreign Application Priority Data

Jun. 9, 2000  (NO) ................................. 20003003

(51) Int. Cl.
*G06K 9/00* (2006.01)

(52) U.S. Cl. .................................... 382/124

(58) Field of Classification Search ........ 382/115–116, 382/124–126; 235/380, 382, 382.5; 340/5.53, 340/5.83
See application file for complete search history.

(56) References Cited

U.S. PATENT DOCUMENTS

| | | |
|---|---|---|
| 5,371,404 A | 12/1994 | Juskey et al. |
| 5,399,898 A | 3/1995 | Rostoker |
| 5,862,248 A | 1/1999 | Salatino et al. |

(Continued)

FOREIGN PATENT DOCUMENTS

EP        0902387 A2    3/1999

(Continued)

OTHER PUBLICATIONS

Balde et al.; "Electronic Materials Handbook, ASM International, vol. 1, Packaging."; pp. 144-145, 297-305, 320-321, 438-442, ISNBN 0-87170-285-1.

(Continued)

*Primary Examiner*—Vikkram Bali
(74) *Attorney, Agent, or Firm*—Rothwell, Figg, Ernst & Manbeck, P.C.

(57) ABSTRACT

Sensor chip, especially for measuring of structures in a finger surface, characterized in that it comprises an electronic ship being in a per se known way provided with a number of sensor electrodes for capacitance measurements, the chip being provided with a first layer comprising a metal or another electrically conducting material over and coupled to the sensor electrodes and a first dielectric layer substantially covering the first metal layer.

10 Claims, 2 Drawing Sheets

U.S. PATENT DOCUMENTS

| | | | |
|---|---|---|---|
| 5,963,679 | A | 10/1999 | Setlak |
| 6,020,749 | A | 2/2000 | Morris et al. |
| 6,026,564 | A | 2/2000 | Wang et al. |
| 6,069,970 | A | 5/2000 | Salatino et al. |
| 6,785,407 | B1 * | 8/2004 | Tschudi et al. ............. 382/124 |

FOREIGN PATENT DOCUMENTS

| | | |
|---|---|---|
| EP | 0919947 A2 | 6/1999 |
| WO | WO9852157 A1 | 11/1998 |
| WO | WO98/58342 * | 12/1998 |

OTHER PUBLICATIONS

Baumgärtner, A. et al.; "Advanced Multichip Module Technologies."; In: Proceedings of the 9$^{th}$ European Hybrid Microelectronics Conference, ISHM. International Society for Hybrid Microelectronic, Jun. 1993, pp. 200-207.

Drüeke, Klaus; "A Sealing Process for Printed-Through Holes" In: Proceedings of the 9$^{th}$ European Hybrid Microelectronics Conference, ISHM. International Society for Hybrid Microelectronic, Jun. 1993, pp. 115-122.

* cited by examiner

MEASURING INSTRUMENT AND METHOD FOR OPTICAL MEASUREMENT OF VELOCITY AND DIRECTION OF PARTICLES

This invention relates to a sensor chip, especially for measuring structures in a finger surface.

Fingerprint sensors based on capacitive coupling of an AC signal from the groove pattern of the finger to an array (matrix) of sensor elements being known from international patent application No PCT/NO98/00182. U.S. Pat. No. 5,963,679 describes a similar sensor with a different measuring principle and a two dimensional sensor matrix.

For special applications, e.g. when being mounted in a cellular phone or a lap-top PC, it is important that the sensor is made as small and light as possible. Such a miniature sensor may also be made a very cost effective is production techniques suitable for mass production are used.

Noise considerations are important when positioning the electronic interrogation circuit, often a costumer specified silicon circuit ("ASIC") as close to the capacitance sensitive elements in the sensor array as possible, so that the length of the electrical conductors between the silicon circuit and the sensor elements is minimized.

The above mentioned requirements related to size and electronic functionality may be difficult to realize using standard packing techniques in which the silicon circuit is mounted in a plastic based or ceramic housing. At the same time as the housing effectively protects the sensor from the outer influences, such a solution may result in a sensor with relative large dimensions, while the housing "legs" gives an unsuitable interface to the finger.

In addition to these general problems it is strongly desirable to provide components adding extra functionality to the interface toward the user, to secure optimal signal quality. Thus it would be a great advantage if such components may be integrated into the sensor itself.

The object of this invention is to secure a cost effective and miniaturized sensor solution based on a naked silicon chip (ASIC) with a multi layer metallization having a surface defining the interface toward the users fingers. The principle is based the fact that the array of imaging sensor elements is positioned in one of the upper metal layers on a silicon surface.

In a standard production process for ASICs the silicon surface is provided with a number of metal layers with conductor leads, being separated by thin dielectric layers. In addition there may be built a so called sandwich structure with extra layers of metal and dielectrics on top of the other layers. By laying the functional structures for detection of the fingers pattern in the upper layers of the ASIC a miniature sensor as described above may be produced.

In U.S. Pat. Nos. 6,069,970, 5,862,248 and 5,963,679 fingerprint sensors are described being based on the above mentioned techniques. These solutions do, however, differ substantially in construction, so that the functions of each layer are different. These solutions relates to very complex two dimensional sensor structures in which the impedance is measured locally with drive electrodes for each pixel. This is, however, making strict requirements to the electronic circuitry in general.

The present invention relates to a simplified solution being characterized as disclosed in claim 1.

Using a stimulation electrode in electrical contact with the finger an impedance measurement is obtained through the finger and the surface to a sensor electrode. This, in addition to the substantially linear sensor structure, thus provides a largely simplified sensor relative to the known solutions for example being simple to produce and implement in small, mobile apparatuses.

Since the sensor thus may be produced using standard processes for IC production, this will give a very cost efficient sensor being suitable for mass production.

The invention will be described below with reference to the enclosed drawings, illustrating the invention by way of example.

As is evident from the drawings the sensor chip according to the invention preferably consists of a naked silicon chip 6 in a housing 7 without a cover (or possibly on a circuit board or ceramic substrate) with a number of layers of metal or another electrically conductive material such as polysilicon, and a dielectric constituting the interface toward the users fingers. The principle is based on imaging sensor elements constituting a part of the third or fourth upper layer of the electrically conductive layers 1 on the silicon circuit, and that the conductor leads, from the elements then is routed individually down to the amplifier circuits on the surface of the silicon chip.

The present solution may be produced industrially by standard methods for ASIC production and packing, as the silicon chip is mounted in a ceramic or plastic based housing without a lid, or on a circuit board or a ceramic substrate. The silicon chip is coupled electrically to the circuit board or housing with so called wire bonding.

Figure 1:
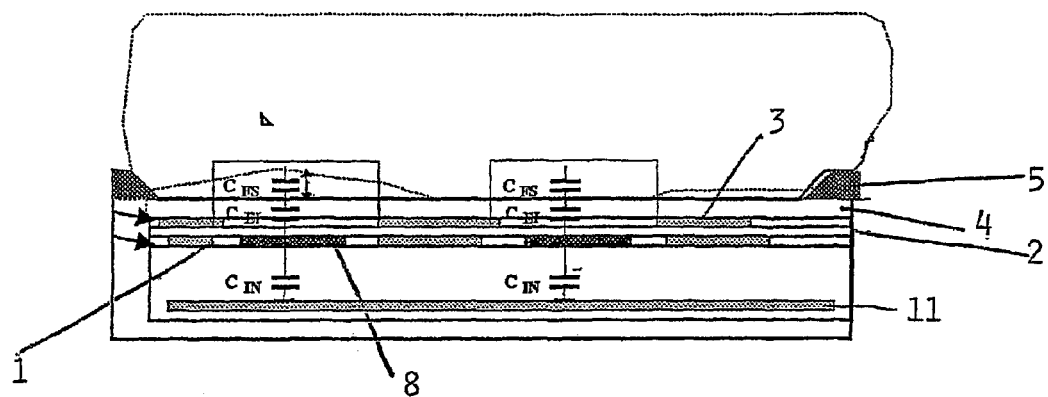
FIG. 1 shows a cross section of the layered construction of metal and dielectrics layers on the upper side of the sensor (schematically).

In order to provide the necessary functionality for the capacitance based measuring principle the three or four upper metal layers on the ASIC must be used for different structures with a given electric function as for example illustrated in FIG. 1. The figure shows a possible solution is not limiting relative to other combinations of layers.

Figure 2:
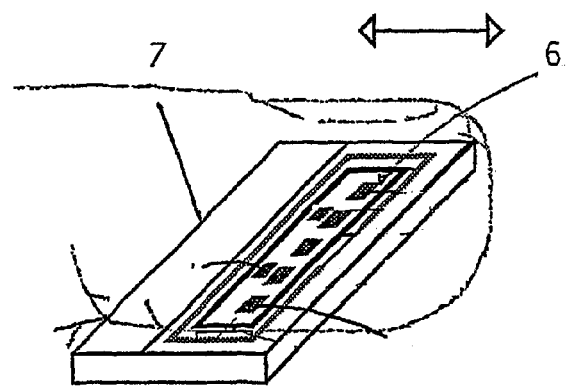
FIG. 2 shows a perspective drawing of the upper side of the sensor and of how the sensor chip may be mounted in a package (schematically).
Figure 3:
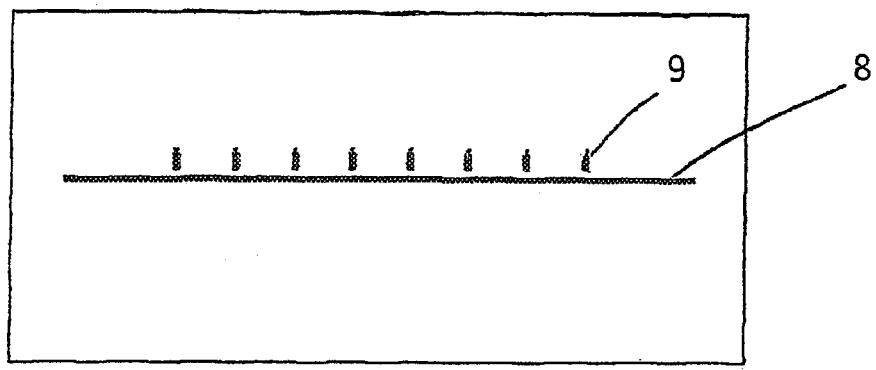
FIG. 3 shows a sketch of the sensor point distribution according to a preferred embodiment of the invention.

The layers provided on the substrate shown in FIGS. 1 and 2 shows examples of the construction of an the ASICs upper layers with metal and dielectric, respectively, and will be explained below. The process for realizing the metal and dielectric layers on the silicon chip is well known technology, but the functionality of the individual layers and the combination of these is covered by the present invention, especially aimed at fingerprint sensors, as a variant of the sensor described in international patent application No. PCT/NO98/00182 which comprises an essentially linear sensor array 8, as shown in FIG. 3. FIGS. 2 and 3 also show secondary sensor groups which may be used for velocity calculations, as described in the above mentioned patent. A line shaped sensor has the great advantage that it needs far less room and less individual channels than a two dimensional sensor with the same resolution, so that it may be made at a much lower cost.

In FIG. 1 the electrical layer 1 constitutes the imaging sensor elements 8. As mentioned the sensor elements may be positioned as shown in FIG. 3, as a variant of the patented solution in international patent application No PCT/NO98/00182.

The dielectric layer 2, in FIG. 1, functions as an insulation layer between the conductor leads in the electrically conductive layer 1 and the earth plane in the electrically conductive layer 3. The layer also constitutes a part of the total dielectric thickness (insulation) between the finger and the sensor element.

The electrically conductive layer 3 constitutes an earthed plane shielding the conductor leads etc against direct coupling of AC signal from the finger and from the modulation ring 5. The earthed layer 3 will preferably be shaped so as to cover all conductor leads on the underlying first electrically conductive layer 1, but must have windows over the sensor elements 8. The openings in the earth plane 3 over the sensor elements 8 contributes with a "lens" effect to shape the electric field and thus the capacitive coupling between the finger and the sensor elements, and the shape of the sensor element 8 and the opening in the second electrically conductive layer 3 may be optimized to maximize the signal strength without going on accord with the geometric resolution of the sensor.

Alternatively the earthed shielding structure may be made using two electrically conductive layers being insulated from each other by a dielectric layer. This will provide an improved shielding and lens effect compared to the use of one layer.

The second dielectric layer 4 may insulate between the earth plane 3 and outer electrically conductive layer 5, and the second dielectric layer 4 functions as an AC coupling of the signal to the electronics. The layer 4 also constitutes (as mentioned above) a part of the total dielectric thickness (insulation) between the finger and the sensor element 8. Since the outer electrically conductive layer 5 of electrical reasons does not cover the area over the sensor elements 8 the finger will come into contact with the second dielectric layer 4. Thus this layer must be hard and wear resistant to withstand wear and breakage, as well as chemical influences from the surrounding environment and from the users fingers and other objects. This may be obtained using hard, impenetrable dielectrics such as $Si_3N_4$ and $SiO_2$.

The first electrically conductive layer 1 may in some cases be constituted by a coupling between a separate electronic circuit and the first dielectric layer, so that they may be produced separately. These two parts may be produced with so called flip-chip technology.

In addition the other electrically conductive layers the chip being sketched in FIG. 1 comprises a lower electrically conductive layer 11 making a common earth plane for the circuit.

Figure 4:
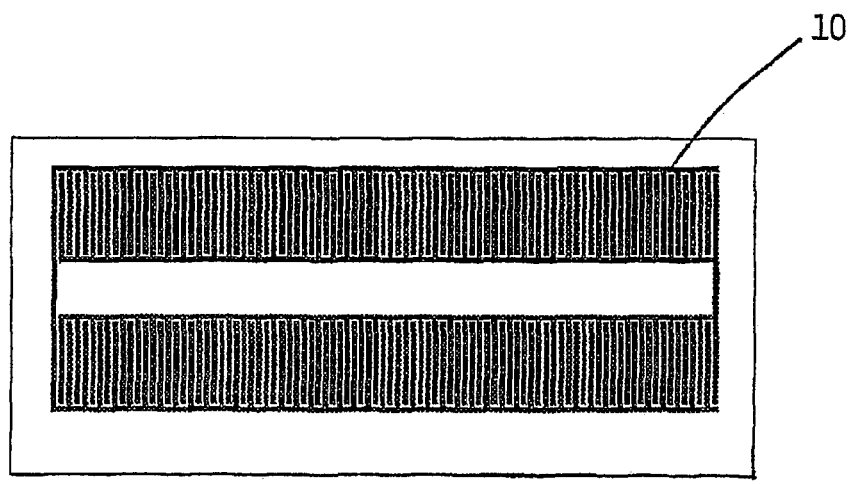
FIG. 4 shows a combined modulation electrode and activation cell for positioning on the sensor chip according to the invention.

The outer electrically conductive layer 5 is the top layer having the purpose of provide a stimulation signal, as mentioned in international patent application No PCT/NO98/00182, into the finger for securing the signal quality, and as illustrated in FIG. 4. This therefore must be electrically conductive with good coupling to the finger. It must also be hard and wear resistant to withstand wear and breakage, as well as chemical influences from the surroundings and the users fingers. Chrome is a possible metal for this purpose.

Preferably the outer electrical conductive layer is coupled to a drive circuit for controlling frequency and amplitude of the stimulation signal.

Such an stimulation electrode may be combined with for example a capacitive activation cell being capable of detecting when a finger touches the sensor, and thus be used to control the activation of the sensor from a hibernation mode to active use, to minimize the power consumption of the sensor.

An impedance activation cell may e.g. be made from as an interdigitated finger structure consisting of two not mutually interconnected "cam structures" (electrodes) 10 being shown in FIG. 4. When a conductive object, e.g. a finger comes close to this structure the impedance between the electrodes will increase, and this change may be detected e.g. by a oscillating circuit operating with low power consumption.

If one of the electrodes is coupled to earth as long as it is in hibernation mode it will provide an effective protection from ESD discharges from a finger or some other charged objects close to the sensor, as the discharge will pass directly to earth. Even if one of these electrodes is not coupled to earth the structures in the outer electrically conductive layer 10 will have an important function for ESD protection if ESD protecting circuits are coupled between the structures in this layer and earth.

An alternative method for coupling of a stimulation frequency into the finger is to cover the conductive material with a thin dielectric film so that the coupling is made purely capacitive. This may have the advantage that the coupling is more equal from person to person and being independent of the dampness of the finger.

As the characteristics of the amplifiers and other signal treatment electronics on the chip will vary from element to element, it may be of great importance to be able to calibrate the response from each sensor element. This may be obtained using a transversal electrode close to the line of sensor elements or the conductors leading to them, e.g. as part of the earthed layer 3 or another electrically conductive layer below it. By providing a calibration signal on this electrode the sensor elements will be excited capacitively without the presence of a finger or other electrically conductive object close to the sensor. Based on the resulting signals from the amplifier and signal treatment electronics it will then be possible to equalize the response from each sensor element.

The present invention consists of a device which in a unique way provides the required advantages for a solid state fingerprint sensor. Corresponding technology may also be used in other applications requiring recognition of finger movements over a surface, e.g. for navigation/mouse purposes.

The invention claimed is:

1. Sensor chip for measuring structures in a finger surface and including an electronic chip being provided with a number of interrogation electrodes for capacitance measurements, said sensor chip comprising:
   a first electrically conductive layer, said first electrically conductive layer comprising sensor points defining positions of sensors in the sensor chip, said sensor points being coupled to the interrogation electrodes in the electronic chip,
   a first dielectric layer substantially covering the first electrically conductive layer, and
   an outer electrically conductive layer for electric contact with said structures in said finger surface, said outer electrically conductive layer comprising openings formed therein at least over the sensors points,
   the electronic chip thus being adapted to measure the capacitance between the outer electrically conductive layer and said interrogation electrodes through the sensor points,
   and wherein the sensor points form an essentially linear array with at least one sensor being adapted to measure relative movement between the array and the finger surface.

2. Sensor chip according to claim 1, wherein the first electrically conductive layer is capacitively coupled to the interrogation electrodes.

3. Sensor chip according to claim 1, wherein the outer electrically conductive layer is coupled to the electronic chip for application of a varying current or voltage to the outer electrically conductive layer.

4. Sensor chip according to claim 3, wherein the outer electrically conductive layer is the only conductor applied with the varying current or voltage.

5. Sensor chip according to claim 1, further comprising a second electrically conductive layer on the first dielectric layer and a second dielectric layer on said second electrically conductive layer, the outer electrically conductive layer being mounted on said second dielectric layer, said second electrically conductive layer constituting an earth plane.

6. Sensor chip according to claim 5, wherein the second electrically conductive layer constitutes an essentially continuous layer with openings defined over the sensor points in the first electrically conductive layer.

7. Sensor chip according to claim 5, wherein the thickness of the first and second dielectric layers is equal to or less than the distance between the centres of the sensor points in the first electrically conductive layer.

8. Sensor chip according to claim 1, comprising a lower electrically conductive layer positioned under the electronic chip.

9. Sensor chip according to claim 1, wherein the outer electrically conductive layer is electrically coupled to an electrical modulator in the electronic chip.

10. Sensor chip according to claim 1, wherein the outer electrically conductive layer comprises a structure changing impedance or capacitance when coming close to an electrically conductive object, which together with a suitable electrical circuit is adapted to activate—the sensor chip when the surface to be measured approaches the sensor chip.

* * * * *

UNITED STATES PATENT AND TRADEMARK OFFICE
CERTIFICATE OF CORRECTION

PATENT NO.        : 7,283,651 B2
APPLICATION NO.   : 10/297745
DATED             : October 16, 2007
INVENTOR(S)       : Vermesan et al.

It is certified that error appears in the above-identified patent and that said Letters Patent is hereby corrected as shown below:

Title, Title page item 54 and Col. 1. change "Measuring Instrument and Method for Optical Measurement of Velocity and Direction of Particles" to --Miniature Sensor Unit, Especially for Finger Print Sensors--.

Signed and Sealed this

Third Day of March, 2009

JOHN DOLL
*Acting Director of the United States Patent and Trademark Office*